(12) United States Patent
Hamann et al.

(10) Patent No.: US 8,981,000 B2
(45) Date of Patent: *Mar. 17, 2015

(54) HIGH STYRENE HIGH VINYL STYRENE-BUTADIENE RUBBER AND METHODS FOR PREPARATION THEREOF

(75) Inventors: Evemarie Hamann, Halle (DE); Silvia Valenti, Halle (DE); Karin Schmiedel, Halle (DE)

(73) Assignee: Styron Europe GmbH, Horgen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/001,605

(22) PCT Filed: Mar. 1, 2012

(86) PCT No.: PCT/EP2012/053524
§ 371 (c)(1),
(2), (4) Date: Oct. 9, 2013

(87) PCT Pub. No.: WO2012/119918
PCT Pub. Date: Sep. 13, 2012

(65) Prior Publication Data
US 2014/0024767 A1 Jan. 23, 2014

(30) Foreign Application Priority Data
Mar. 4, 2011 (EP) ..................................... 11156987

(51) Int. Cl.
| | | |
|---|---|---|
| C08L 9/06 | (2006.01) | |
| C08F 236/06 | (2006.01) | |
| C08F 236/10 | (2006.01) | |
| C08F 4/48 | (2006.01) | |
| C08F 2/06 | (2006.01) | |
| C08F 212/08 | (2006.01) | |
| C08F 297/04 | (2006.01) | |
| C08K 11/00 | (2006.01) | |
| B60C 1/00 | (2006.01) | |

(52) U.S. Cl.
CPC ............. *C08F 236/10* (2013.01); *C08F 212/08* (2013.01); *C08L 9/06* (2013.01); *C08F 297/04* (2013.01); *C08K 11/00* (2013.01)

USPC ........... 524/575; 524/571; 526/181; 526/204; 526/340

(58) Field of Classification Search
USPC ........... 524/572, 575, 571; 526/181, 204, 340
See application file for complete search history.

(56) References Cited

U.S. PATENT DOCUMENTS

| | | | |
|---|---|---|---|
| 3,496,154 A * | 2/1970 | Wofford | 526/174 |
| 5,008,343 A * | 4/1991 | Hellermann et al. | 525/316 |
| 5,532,327 A | 7/1996 | Bayley et al. | |
| 5,698,646 A | 12/1997 | Kitamura et al. | |
| 5,916,962 A | 6/1999 | Shibata et al. | |
| 6,472,464 B1 | 10/2002 | Morita et al. | |
| 2005/0020757 A1 | 1/2005 | Ozawa et al. | |
| 2008/0015309 A1 | 1/2008 | Ozawa et al. | |
| 2011/0178256 A1 | 7/2011 | Hamann et al. | |
| 2014/0107286 A1* | 4/2014 | Hamann et al. | 524/575 |

FOREIGN PATENT DOCUMENTS

| | | |
|---|---|---|
| EP | 0798339 | 10/1997 |
| EP | 1462459 | 9/2004 |
| WO | WO2009/134665 | 11/2009 |

OTHER PUBLICATIONS

PCT/EP2012/053523 International Search Report dated May 21, 2012 (3 pages).
PCT/EP2012/053524 International Search Report dated May 21, 2012 (2 pages).
PCT/EP2012/053524 International Preliminary Report on Patentability dated Sep. 10, 2013 (7 pages).

* cited by examiner

*Primary Examiner* — Fred M Teskin
(74) *Attorney, Agent, or Firm* — Brinks Gilson & Lione

(57) ABSTRACT

A polymer has at least the following characteristics: (a) a block styrene content containing 4 to 6 styrene units from about 27 to about 50 weight percent based on total styrene content in the polymer; (b) a vinyl content from about 30 to about 80 weight percent based on total amount of polymerized 1,3-butadiene; and (c) a styrene content from about 40 to about 70 weight percent based on total weight of polymer. Processes for the polymerization of such a polymer, compositions containing such a polymer, and articles containing at least one component formed from such a composition are described.

23 Claims, No Drawings

HIGH STYRENE HIGH VINYL STYRENE-BUTADIENE RUBBER AND METHODS FOR PREPARATION THEREOF

This application claims priority to International Application No. PCT/EP2012/053524 filed Mar. 1, 2012; and European Application No. 11156987.7 filed Mar. 4, 2011, the entire contents of each are incorporated herein by reference.

TECHNICAL FIELD

The present teachings relate generally to high styrene high vinyl solution-based styrene-butadiene rubber (SSBR)—particularly to high styrene high vinyl SSBR with a defined incorporation of styrene—and to methods for the preparation thereof.

BACKGROUND

High styrene and high vinyl SSBR is difficult to produce due to the kinetics of copolymerization. Typically, polar agents known as randomizers are added to the polymerization system in order to achieve random styrene incorporation.

The use of certain randomizers can result in high vinyl SSBR having a low block styrene content (>6 successive units of styrene) below 10%. Long block styrene can worsen hysteresis as reported, for example, by S. Futamura and G. Day who observed a worsening by about 18% of the tan delta at 60° C. when increasing block styrene content from 2 to about 7% (Kautschuk Gummi Kunststoffe, 1987, 40, No. 1, 39-43) in a carbon black-filled compound. By contrast, incorporation of small styrene blocks can result in improved abrasion and tensile strengths, particularly in silica compounds, as reported by I. Hattori et al, (143rd Meeting of the Rubber Division of the ACS, Spring 1993, paper 22).

In certain applications, it would be desirable to achieve a high styrene high vinyl SSBR having a defined incorporation of styrene as blocks of 4-6 units.

SUMMARY

The scope of the present invention is defined solely by the appended claims, and is not affected to any degree by the statements within this summary.

By way of introduction, a polymer embodying features of the present teachings has at least the following characteristics: (a) a block styrene content containing 4 to 6 styrene units from about 27 to about 50 weight percent based on total styrene content in the polymer; (b) a vinyl content from about 30 to about 80 weight percent based on total amount of polymerized 1,3-butadiene; and (c) a styrene content from about 40 to about 70 weight percent based on total weight of polymer.

A process for polymerization of a polymer comprising monomeric units derived from a styrene monomer and a 1,3-butadiene monomer that embodies features of the present teachings includes polymerizing the monomeric units in the presence of an initiator and a polar agent. The polar agent comprises a structure I:

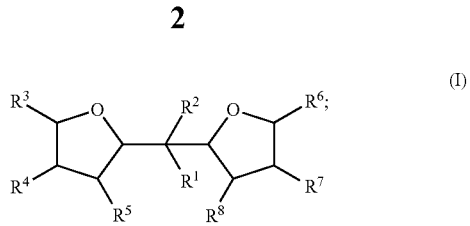

wherein $R^1$ and $R^2$ are each independently an alkyl group; wherein $R^3$, $R^4$, $R^5$, $R^6$, $R^7$ and $R^8$ are each independently selected from the group consisting of an alkyl group and hydrogen; wherein a molar ratio of the polar agent to active initiator is greater than about 0.5; wherein styrene content of a monomer mixture added in the polymerization is greater than about 40 weight percent based on total weight of added monomers; and wherein the polymerization is run at a temperature of less than about 80° C.

DETAILED DESCRIPTION

The present inventors have discovered—surprisingly and unexpectedly—a high styrene, high vinyl SSBR with a narrow molecular weight distribution, an incorporation of styrene in blocks of 4-6 units ranging from about 27 to about 50%, and a block styrene content with more than 6 consecutive units of less than about 20%.

Moreover, the present inventors have further discovered—surprisingly and unexpectedly—that it is possible to prepare the above-described high styrene high vinyl SSBR using an initiator (e.g., butyl lithium) and a randomizer (e.g., ditetrahydrofurylpropane, also known as 2,2-di(2-oxolanyl)propane or DOP) under the following conditions: styrene content≥40 wt %; molar ratio of DOP/active initiator≥0.5; and polymerization temperature≤80° C.

Throughout this description and in the appended claims, the following definitions are to be understood:

The term "polymer" refers broadly to a material prepared via the polymerization of monomeric units. As used herein, the term "polymer" subsumes the terms "homopolymer" (polymeric material prepared from a single type of monomer), "copolymer" (polymeric material prepared from two different types of monomers), and "interpolymer" (polymeric material prepared from more than two different types of monomers).

The phrase "alkyl group" refers to a substituted or unsubstituted, straight, branched or cyclic hydrocarbon chain containing, preferably, from 1 to 20 carbon atoms. Representative examples of unsubstituted alkyl groups for use in accordance with the present teachings include but are not limited to methyl, ethyl, propyl, iso-propyl, cyclopropyl, butyl, iso-butyl, tert-butyl, sec-butyl, cyclobutyl, and the like.

The term "process" used in reference to polymerization reactions includes batch, semi-batch, and/or continuous processes.

The phrase "batch-" or "semi-batch" used in reference to a polymerization refers to a polymerization in which more than 60% of the solvent is charged in the reactor together with additional polymerization ingredients before start of the polymerization by charge of the initiator. The monomer can be charged at once before the addition of initiator, partially before the addition of initiator, partially after the addition of initiator or at once continuously after addition of the initiator over a certain time period.

The phrase "continuous polymerization" refers to a polymerization process in which the solvent, monomer(s), and any additional polymerization ingredients are fed in a continuous matter to a reactor in specified volumetric ratios. In some embodiments, two or more polymerization reactors connected in series are used. In some embodiments, reagents are fed to only one reactor.

The phrase "vinyl content" refers to a mass (or weight) percentage of butadiene incorporated in the 1,2 position in the polymer chain, and is based on the butadiene portion (total amount of polymerized butadiene) in the polymer.

The phrase "styrene content" refers to a mass (or weight) percentage of styrene in the polymer, and is based on the total weight of the polymer.

The phrase "block styrene content" refers to a weight fraction of styrene incorporated as consecutive sequences of styrene units based on the total amount of polymerized styrene in the polymer.

The term "composition" refers to a mixture of materials including a polymer material and, optionally, reaction products and/or decomposition products formed from the polymer material.

The term "active initiator" (nBL,pm) refers to the amount of initiator (e.g., an organlithium) that takes part in a polymerization reaction and that is not deactivated by impurities contained in the reaction medium. The term "excess initiator" (nBL,exc) refers to the amount of initiator that is charged to deactivate the impurities in the system.

The phrase "total amount of monomer feed" refers to the total amount of styrene and butadiene, in g/min, fed in a continuous polymerization reactor and, typically, in the first continuous polymerization reactor.

The phrase "total monomer conversion" refers to the final monomer conversion (e.g., the final sum conversion of styrene and butadiene) determined for the last polymerization reactor.

By way of general introduction, a polymer in accordance with the present teachings has at least the following characteristics: (a) a block styrene content containing 4 to 6 styrene units from about 27 to about 50 weight percent based on total styrene content in the polymer; (b) a vinyl content from about 30 to about 80 weight percent based on total amount of polymerized 1,3-butadiene; and (c) a styrene content from about 40 to about 70 weight percent based on total weight of polymer.

In some embodiments, a polymer in accordance with the present teachings has a block styrene content with more than 6 consecutive styrene units of less than about 10 weight percent based on total styrene content in the polymer.

In some embodiments, a polymer in accordance with the present teachings has a block styrene content with more than 6 consecutive styrene units of less than about 25 weight percent based on total styrene content in the polymer.

In some embodiments, a polymer in accordance with the present teachings has an amount of styrene incorporated with fewer than 4 consecutive styrene units of between about 30 and about 73 weight percent based on total weight of the incorporated styrene. In some embodiments, the amount of styrene incorporated with fewer than 4 consecutive styrene units is between about 35 and about 70 wt % based on total weight of the incorporated styrene.

In some embodiments, a polymer produced in batch process in accordance with the present teachings has a molecular weight distribution (Mw/Mn) from about 1.05 to about 2. In some embodiments, the molecular weight distribution is from about 1.1 to about 1.8. In some embodiments, the molecular weight distribution is from about 1.2 to about 1.6.

In some embodiments, a polymer produced in continuous process in accordance with the present teachings has a molecular weight distribution (Mw/Mn) from about 1.5 to about 2.5. In some embodiments, the molecular weight distribution is from about 1.6 to about 2.4. In some embodiments, the molecular weight distribution is from about 1.8 to about 2.2.

In some embodiments, a polymer in accordance with the present teachings has a number-average molecular weight greater than or equal to about 80,000 g/mole. In some embodiments, the number-average molecular weight is greater than or equal to about 150,000 g/mole. In some embodiments, the number-average molecular weight is greater than or equal to about 300,000 g/mole.

In some embodiments, a polymer in accordance with the present teachings has a weight-average molecular weight greater than or equal to about 84,000 g/mole. In some embodiments, the weight-average molecular weight is greater than or equal to about 155,000 g/mole. In some embodiments, the weight-average molecular weight is greater than or equal to about 310,000 g/mole.

In some embodiments, a polymer in accordance with the present teachings has a Mooney Viscosity (ML 1+4 at 100° C.) from about 20 to about 150. In some embodiments, a polymer in accordance with the present teachings has a Mooney Viscosity (ML 1+4 at 100° C.) from about 30 to about 120. In some embodiments, a polymer in accordance with the present teachings has a Mooney Viscosity (ML 1+4 at 100° C.) from about 30 to about 90.

By way of further general introduction, a process for polymerization of a polymer comprising monomeric units derived from a styrene monomer and a 1,3-butadiene monomer in accordance with the present teachings includes polymerizing the monomeric units in the presence of an initiator and a polar agent, wherein the polar agent comprises a structure I:

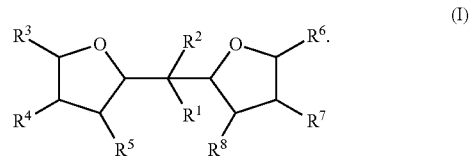

In some embodiments, $R^1$ and $R^2$ are each independently an alkyl group. In some embodiments, $R^1$ and $R^2$ are each independently a $C_1$-$C_4$ alkyl group. In some embodiments, $R^1$ and $R^2$ are each methyl.

In some embodiments, $R^3$, $R^4$, $R^5$, $R^6$, $R^7$ and $R^8$ are each independently selected from the group consisting of an alkyl group and hydrogen. In some embodiments, $R^3$, $R^4$, $R^5$, $R^6$, $R^7$ and $R^8$ are each independently selected from the group consisting of hydrogen and a $C_1$-$C_4$ alkyl group. In some embodiments, $R^3$, $R^4$, $R^5$, $R^6$, $R^7$ and $R^8$ are each independently selected from the group consisting of hydrogen and methyl. In some embodiments, $R^3$, $R^4$, $R^5$, $R^6$, $R^7$ and $R^8$ are each hydrogen.

In some embodiments, a molar ratio of the polar agent to active initiator is greater than about 0.5. In some embodiments, a molar ratio of the polar agent to active initiator is between about 0.5 and about 10.

In some embodiments, the styrene content of a monomer mixture added in the polymerization is greater than about 40 weight percent based on total weight of added monomers.

In some embodiments, a polymerization in accordance with the present teachings is run at a temperature of less than about 80° C. In some embodiments, a polymerization in accordance with the present teachings is run at a temperature of between about 10° C. and about 80° C.

Initiators that are presently preferred for use in accordance with the present teachings include those suitable for anionic polymerizations. In some embodiments, an initiator for use in accordance with the present teachings is an organolithium (e.g., alkyl lithium). Representative alkyl lithium agents for use in accordance with the present teachings include but are not limited to n-butyl lithium, sec-butyl lithium, tert-butyl lithium, n-pentyl lithium, and the like, and combinations thereof. In some embodiments, the initiator comprises n-butyl lithium.

In some embodiments, total monomer conversion is greater than about 96 weight percent based on total amount of monomer feed. In some embodiments, total monomer conversion is greater than about 98 weight percent. In some embodiments, total monomer conversion is greater than about 99 weight percent.

In some embodiments, a polymer in accordance with the present teachings has a vinyl content from about 30 to about 80 weight percent based on total amount of polymerized 1,3-butadiene. In some embodiments, the vinyl content is from about 40 to about 70 weight percent.

In some embodiments, a polymer in accordance with the present teachings has a block styrene content containing 4 to 6 styrene units from about 27 to about 50 weight percent based on total styrene content in the polymer.

In some embodiments, a polymer in accordance with the present teachings has a block styrene content with more than 6 consecutive styrene units of less than about 10 weight percent based on total styrene content in the polymer.

In some embodiments, a polymer in accordance with the present teachings has a block styrene content with more than 6 consecutive styrene units of less than about 25 weight percent based on total styrene content in the polymer.

It is presently preferred that polymerizations in accordance with the present teachings take place in solvents, with hydrocarbon solvents being presently preferred. In some embodiments, the polymerization solvent comprises an alkane. In some embodiments, the polymerization solvent comprises cyclohexane. In some embodiments, the polymerization solvent comprises a mixture of cyclohexane with one or more additional alkanes.

By way of further general introduction, a polymer in accordance with the present teachings is formed by a process of a type described herein.

In some embodiments, a polymer in accordance with the present teachings is modified with a modifying agent (or modifier). Representative modifying agents include but are not limited to amines, amides, thioglycols, silicon alkoxides, silane-sulfide modifiers, and the like, and combinations thereof.

In some embodiments, a living polymer in accordance with the present teachings can be chemically modified by chain-end modification and/or coupling reactions. The appropriate chain-end modifiers and/or coupling agents can be chosen according to the target application and filler. Representative coupling agents include but are not limited to tin tetrachloride, silicon tetrachloride, divinylbenzene, alkoxysilanes, and the like, and combinations thereof.

Representative modifiers include but are not limited to sulfenyl halides as described in European Patent Document No. EP1016674, benzophenone, isocyanate, hydroxyl mercaptans as described in European Patent Document No. EP0464478, and acrylamide compounds as described in European Patent Document No. EP0334042. Additional modifiers include but are not limited to amines, amides, imides, and nitriles modifiers as described in European Patent Document Nos. EP548799, EP510410, EP451604, and EP180141, and in U.S. Pat. No. 4,412,041. In some embodiments, silanes including but not limited to epoxy-containing silanes are used for modifying the polymer chain end for use in silica fillers as described, for example, in European Patent Document Nos. EP-A-299074, EP-A-102045, EP0447066, and EP0692493. Additional representative modifiers and/or patent references referring to such are provided in International Patent Document No. WO 2009/134665.

By way of further general introduction, a composition embodying features of the present teachings includes a polymer of a type described herein. In some embodiments, a composition in accordance with the present teachings further includes an oil. In some embodiments, a composition in accordance with the present teachings further includes an oil in an amount from about 5 to about 40 weight percent based on weight of the polymer. In some embodiments, a composition in accordance with the present teachings does not include an oil.

In some embodiments, a composition in accordance with the present teachings includes a polymer of a type described herein and at least one additive. In some embodiments, the polymer is combined and/or reacted with one or more fillers, a vulcanization agent, and/or optionally one or more additional additives including but not limited to accelerators, coupling agents, unmodified, uncrosslinked elastomeric polymers (i.e., conventional uncrosslinked elastomeric polymers that have not been reacted with a modifier, but that have been prepared and terminated), and the like, and combinations thereof.

In some embodiments, a composition in accordance with the present teachings includes one or more fillers, which serve as reinforcement agents. Representative examples of suitable fillers include but are not limited to carbon black, silica, carbon-silica dual-phase filler, clay, calcium carbonate, magnesium carbonate, and the like, and combinations thereof. In some embodiments, a combination of carbon black and silica, carbon-silica dual-phase-fillers or a combination of carbon-silica dual-phase-filler and carbon black and/or silica are used.

In some embodiments, carbon black is manufactured by a furnace method, and has a nitrogen adsorption specific surface area from about 50 to about 200 $m^2/g$, and a DBP oil absorption from about 80 to about 200 ml/100 grams (e.g., FEF, HAF, ISAF or SAF class carbon black). In some embodiments, a "high agglomeration type" carbon black is used, in some embodiments, carbon black or silica is added in an amount from about 2 to about 100 parts by weight for 100 parts by weight of total polymer. In some embodiments, carbon black or silica is added in an amount from about 5 to about 100 parts by weight. In some embodiments, carbon black or silica is added in an amount from about 10 to about 100 parts by weight. In some embodiments, carbon black or silica is added in an amount from about 10 to 95 parts by weight.

Finally, by way of further general introduction, an article embodying features of the present teachings includes at least one component formed from such a composition. In some embodiments, the article is a tire. In some embodiments, the article is a shoe component.

The following examples and representative procedures illustrate features in accordance with the present teachings, and are provided solely by way of illustration. They are not intended to limit the scope of the appended claims or their equivalents.

EXAMPLES

Monomer conversion was determined by measuring the solids concentration of the polymer solution at the end of the polymerization. The maximum solid content is obtained at 100 wt % conversion of the charged butadiene (mBd) and styrene (mSt) for the final polymer by TSC max=(mBd+mSt)/(mBd+mSt+mpolar agent+mBL+mcyclohexane)*100%. A sample of polymer solution ranging from about 1 g to about 10 g, depending on the expected monomer conversion, was drawn from the reactor directly into a 200-mL Erlenmeyer flask filled with ethanol (50 mL). The weight of the filled Erlenmeyer flask was determined before sampling ("A") and after sampling ("B"). The precipitated polymer was removed from the ethanol by filtration on a weighted paper filter (Micro-glass fiber paper, ϕ90 mm, MUNKTELL, weight "C"), dried at 140° C., using a moisture analyzer HR73 (Mettler-Toledo) until a constant mass was achieved. The criterion 5 was used. Finally, a second drying period was performed using switch-off criteria 4 to obtain the final mass "D" of the dry sample on the paper filter. The polymer content in the sample was calculated as TSC=(D−C)/(B−A)*100%. The final monomer conversion was calculated as TSC/TSC max*100%.

Molecular weight and molecular weight distribution of the polymer were each measured using Size Exclusion Chromatography (SEC) at 40° C. based on polystyrene standards. Each polymer sample (9-11 mg) was dissolved in tetrahydrofuran (10 mL) to form a solution. The solution was filtered using a 0.45-μm filter. A 100-μL sample was fed into a GPC column (Hewlett Packard system 1100 with 3 PLgel 10 μm MIXED-B columns). Refraction Index-detection was used as the detector for analyzing the molecular weight. The molecular weight was calculated as polystyrene based on the calibration with EasiCal PS1 (Easy A and B) Polystyrene standards from Polymer Laboratories. The number-average molecular weight (Mn) figures and the weight-average molecular weight (Mw) figures are given based on the polystyrene standards. The molecular weight distribution is expressed as the dispersity D=Mw/Mn.

Vinyl and total styrene content were measured using $^1$H-NMR, following ISO 21561-2005, using a NMR spectrometer BRUKER Avance 400 MHz), and a 5-mm dual probe. CDCl$_3$/TMS was used as solvent in a weight ratio of 0.05%:99.95%. The content of block styrene consisting of more than 6 consecutive styrene units was determined according to the method reported by Y. Tanaka et al. in *Rubber Chemistry and Technology,* 1981, 54, No. 4,685-691 using the relative intensity of ortho Ph-proton signals resonating higher than 6.7 ppm. The content of block styrene consisting of 4 and more consecutive styrene units was determined according to the method described in German Patent Document No. DE69712962 using the relative intensity of the ortho Ph-proton signals resonating in the range between 6.94 and 6 ppm. The content of block styrene consisting of 4 to 6 consecutive units was calculated from the difference between both of the above-described block styrene contents.

Mooney Viscosity ML1+4 (100° C.)

Mooney viscosity of a polymer (no filler and no oil) was measured according to ASTM D 1646 (2004), with a preheating time of one minute, and a rotor operation time of four minutes, at a temperature of 100° C. [ML1+4(100° C.)] on a MV2000 E from Alpha-Technologies.

Comparative Example 1

Use of DOP, 1 mol/mol, Styrene Ratio in Monomer 21%, 65° C.

Dried cyclohexane (255 g) was added to an air-free and nitrogen-purged 2-L stainless steel reactor. 1,3-Butadiene (35.55 g), styrene (9.45 g), and DOP (0.2727 mmol, 25 wt % solution in cyclohexane) were fed into the reactor (DOP/active butyl lithium mol/mole=1). The reaction was started by adding the following amounts of n-butyllithium as 0.6278 mol/kg solution in cyclohexane: nBL,exc=0.135 mmol for conversion of the impurities and nBL,pm=0.2727 mmol for the reaction. The mixture was heated up to 65° C. with stirring. The reaction was terminated after 30 minutes by the addition of methanol as a terminating agent. The 4,6-bis (octylthiomethyl)-o-cresol sold under the tradename IRGANOX 1520 (Ciba) was introduced as antioxidant.

A sample was withdrawn by means of a sampling tube with a stopcock and a needle for determination of the solid content. A conversion of 100% was measured.

The resulting polymer was analyzed by GPC: Mn=215586, Mw=236158, D=1.095.

The microstructure and styrene block content were measured by $^1$H-NMR. The following results were obtained: styrene=21.2%, vinyl(1,2-polybutadiene, calculated on the butadiene fraction)=62.2%, block styrene (>6 styrene units); 2%, block styrene comprising 4-6 styrene units: 12%.

Although the DOP/nBL,pm ratio and temperature were in an inventive range the styrene content of 21% was too low to achieve an inventive content of block styrene comprising 4-6 styrene units.

Comparative Example 2

Use of DOP, 0.4 mol/mol, Styrene Ratio in Monomer 40%, 60° C.

Dried cyclohexane (255 g) was charged into an air-free and nitrogen-purged 2-L stainless steel reactor, 1,3-Butadiene (27 g), styrene (18 g), and DOP (0.1052 mmol, 23.38% solution in cyclohexane) were fed into the reactor (DOP/active butyl lithium mol/mol=0.3974). The reaction was started by adding the following amounts of n-butyllithium as 0.4451 mol/kg solution in cyclohexane: nBL,exc=0.32 mmol for conversion of the impurities and nBL,pm=0.2647 mmol for the reaction. The mixture was heated up to 60° C. with stirring. The polymer was coupled after 120 minutes by adding TMS (0.075 mol/mol). The remaining uncoupled polymer was terminated after 30 minutes by the addition of methanol as a terminating agent. IRGANOX 1520 was introduced as antioxidant.

A sample was withdrawn by means of a sampling tube with a stopcock and a needle for determination of the solid content. A conversion of 97.24% was measured.

The resulting coupled polymer was analyzed by GPC: Mn=222029, Mw=381586, D=1.719 at 23% coupled polymer.

The microstructure and styrene block content were measured by $^1$H-NMR. The following results were obtained: styrene=41.4%, vinyl(1,2-polybutadiene, calculated on the butadiene fraction)=47%, block styrene (>6 styrene units): 3%, block styrene comprising 4-6 styrene units: 24%.

Although the styrene content and the temperature were in an inventive range, the DOP/nBL,pm ratio of 0.3974 was too low to achieve an inventive content of block styrene comprising 4-6 styrene units.

Comparative Example 3

Use of DOP, 0.4 mol/mol, Styrene Ratio in Monomer 40%, 85° C.

Dried cyclohexane (255 g) was added to an air-free and nitrogen-purged 2-L stainless steel reactor. 1,3-Butadiene (27 g), styrene (18 g), and DOP (0.1052 mmol, 23.38% solution in cyclohexane) were fed into the reactor (DOP/active butyl lithium mol/mol=0.3974). The reaction was started by adding the following amounts of n-butyllithium as 0.4451 mol/kg solution in cyclohexane: nBL,exc=0.32 mmol for conversion of the impurities and nBL,pm=0.2647 mmol for the reaction. The mixture was heated up to 85° C. with stirring. The polymer was coupled after 30 minutes by adding TMS (0.075 mol/mol). The remaining uncoupled polymer was terminated after 30 minutes by the addition of methanol as a terminating agent. IRGANOX 1520 was introduced as antioxidant.

A sample was withdrawn by means of a sampling tube with a stopcock and a needle for determination of the solid content. A conversion of 95.62% was measured.

The resulting coupled polymer was analyzed by GPC: Mn=210590, Mw=378049, D=1.795 at 22.3% coupled polymer.

The microstructure and styrene block content were measured by $^1$H-NMR. The following results were obtained: styrene=42.1%, vinyl(1,2-polybutadiene, calculated on the butadiene fraction)=33.4%, block styrene (>6 styrene units): 14%, block styrene comprising 4-6 styrene units: 20%.

Although the styrene content was in an inventive range, the DOP/active butyllithium ratio of 0.4 was too low and the applied temperature of 85° C. was too high to achieve an inventive content of block styrene comprising 4-6 styrene units.

Example 1

Use of DOP, 1 mol/mol

Dried cyclohexane (5208.11 g) was added to an air-free and nitrogen-purged 10-L stainless steel reactor, 1,3-Butadiene (317.28 g), styrene (393.11 g), and DOP (1.1866 mmol) were fed into the reactor (DOP/active butyllithium=0.9808).

The mixture was heated up to 50° C. with stirring. The impurities in the system were titrated by stepwise addition of butyllithium. Recognizing the endpoint, the polymerization was started by the addition of an amount of active butyl lithium nBL,pm of 1.2098 mmol (0.2585 mol/kg solution in cyclohexane) via pump within 1 minute and 22 seconds. Then, the polymerization started. The temperature in the reactor increased to 65° C. within 30 minutes. The reaction was stopped after 200 minutes by the addition of methanol as a terminating agent. IRGANOX 1520 was introduced as antioxidant.

A sample was withdrawn by means of a sampling tube with a stopcock and a needle for determination of the solid content. A conversion of 99.26% was measured.

The resulting polymer was analyzed by GPC: Mn=587535, Mw=755240, D=1.285. The microstructure and styrene block content were measured by $^1$H-NMR. The following results were obtained: styrene=55.9%, vinyl(1,2-polybutadiene, calculated on the butadiene fraction)=49%, block styrene (>6 styrene units): 8%, block styrene comprising 4-6 styrene units' 37%.

Example 2

Use of DOP, 1 mol/mol

Dried cyclohexane (21236.38 g) was added to an air-free and nitrogen-purged 40-L stainless steel reactor. 1,3-Butadiene (838.13 g), styrene (1018.1 g), and DOP (4.1557 mmol) were fed into the reactor (DOP/active butyl lithium mol/mol=1.0924).

The mixture was heated up to 50° C. with stirring. The impurities in the system were titrated by stepwise addition of butyllithium. Recognizing the endpoint, the polymerization was started by the addition of an amount of active butyl lithium nBL,pm of 3.8051 mmol of n-butyl lithium (0.2585 mol/kg solution in cyclohexane) via pump within about 2 minutes. Then, the polymerization started. The temperature in the reactor increased to 65° C. within 30 minutes. The conversion was complete after 90 minutes. A sample was taken and the resulting polymer was analyzed by GPC: Mn=528631, Mw=638245, D=1.207. The microstructure and styrene block content were measured by $^1$H-NMR.

The reaction was stopped by the addition of a coupling agent and the remaining uncoupled chains were finally stopped after an additional 30 minutes by the addition of methanol as a terminating agent. IRGANOX 1520 was introduced as antioxidant.

The following results were obtained: styrene=53.8%, vinyl (1,2-polybutadiene, calculated on the butadiene fraction)=47.6%, block styrene (>6 styrene units): 8%, block styrene comprising 4-6 styrene units: 37%, Example 3

Use of DOP, 41% Styrene

Dried cyclohexane (21194.98 g) was added to an air-free and nitrogen-purged 40-L stainless steel reactor, 1,3-Butadiene (1008.13 g), styrene (831.75 g), and DOP (2.3106 mmol) were fed into the reactor (DOP/active butyl lithium mol/mol=0.9822).

The mixture was heated up to 50° C. with stirring. The impurities in the system were titrated by stepwise addition of butyl lithium. Recognizing the endpoint, the polymerization was started by the addition of an amount of active butyl lithium nBL,pm of 2.3524 mmol of n-butyl lithium (0.2585 mol/kg solution in cyclohexane) via pump within 1 minute. Then, the polymerization started. The temperature in the reactor increased to 65° C. within 30 minutes. The reaction was stopped after 210 minutes by the addition of methanol as a terminating agent. IRGANOX 1520 was introduced as antioxidant.

A sample was withdrawn by means of a sampling tube with a stopcock and a needle for determination of the solid content. A conversion of 96.34% was measured.

The resulting polymer was analyzed by GPC: Mn=1652619, Mw=2578087, D=1.56. The microstructure and styrene block content were measured by $^1$H-NMR. The following results were obtained: styrene=41%, vinyl(1,2-polybutadiene, calculated on the butadiene fraction)=46.5%, block styrene (>6 styrene units): 3%, block styrene comprising 4-6 styrene units: 29%.

Example 4

Use of DOP, 46.5% Styrene

Dried cyclohexane (21215.19 g) was charged into an air-free and nitrogen-purged 40-L stainless steel reactor. 1,3-Butadiene (974 g), styrene (888.15 g), and DOP (2.16129 mmol) were fed into the reactor (DOP/active butyl lithium mol/mol=0.9244).

The mixture was heated up to 50° C. with stirring. The impurities in the system were titrated by stepwise addition of butyllithium. Recognizing the endpoint, the polymerization was started by the addition of an amount of active butyl lithium nBL,pm of 2.236 mmol of n-butyl lithium (0.2585 mol/kg solution in cyclohexane) via pump within about 1 minute. Then, the polymerization started. The temperature in the reactor increased to 65° C. within 30 minutes. A sample was withdrawn after 120 minutes by means of a sampling tube with a stopcock and a needle for determination of the solid content. A conversion of 99.17% was measured.

The polymer was analyzed by GPC: Mn=868986, Mw=1117669, D=1.286. The polymer was coupled after 30 minutes by adding TMS (0.078 mol/mol) The reaction was stopped after 240 minutes by the addition of methanol as a terminating agent. IRGANOX 1520 was introduced as antioxidant.

The polymer was analyzed by GPC: Mn=980410, Mw=1562027, D=1.59 at 17% coupling. The microstructure and styrene block content were measured by $^1$H-NMR. The following results were obtained: styrene=46.5%, vinyl(1,2-polybutadiene, calculated on the butadiene fraction)=40.3%, block styrene (>6 styrene units): 9%, block styrene comprising 4-6 styrene units: 42%.

Comparative Example 4

Continuous Polymerization, T=85° C., DOP/Active Initiator≈2

The reaction is performed in two CSTR reactors connected in series. The first reactor has a volume of 6.3 L and the second of 12.6 L.

The reactors are equipped with a helicoidal stirrer suitable for the mixing of high viscosity solutions. The reactors are run completely full. External water circulation in the reactor walls regulates the desired temperature. The ingredients (styrene, butadiene, cyclohexane, DOP, 1,2-Butadiene (1,2-Bde) and n-Butyl lithium are fed in the head of the first reactor with mass flow-meters (Micromotion) that allow regulation of the desired feed and guarantee a constant flow. Cyclohexane was purified by passage through an alumina column. The initiator (n-butyl lithium in cyclohexane) is fed at the inlet of the first reactor. DOP and 1,2-butadiene were diluted in cyclohexane in order to enable administration of a precise amount to the reaction. Amounts for the dilution of the chemicals are reported in the examples together with the solvent as cyclohexane feed.

A ratio of monomers in the total feed of 12% was employed. The following conditions were employed in this trial: styrene butadiene=44 wt %:56 wt %; DOP/nBL,pm (mol/mol)=2.18. The temperatures of both reactors were kept at 85° C. The flow of the total amount of ingredients and solvent was regulated in order to achieve a residence time of 45 minutes in the first reactor and 90 minutes in the second reactor. The following amounts were fed into the first polymerization reactor: Sty=5.31 g/min, Bde=7.04 g/min, Cyclohexane=90.57 g/min, nBL,pm=0.0692 mmol/min, nBL, exc=0.0064 mmol/min, DOP=0.151 mmol/min, 1,2-Bde=0.121 mmol/min.

Methanol as terminating agent and IRGANOX 1520 (0.15 phr) as antioxidant were added to the polymeric solution out of the second reactor A total conversion of 95% was obtained out of the first reactor, and a complete conversion was obtained out of the second reactor.

The polymer coming out of the second reactor was analyzed by GPC with a polystyrene calibration: Mn=254704 g/mol, Mw=507879 g/mol, MWD=1.994. The microstructure and styrene block content were measured by $^1$H-NMR. The following results were obtained: styrene=44.5%, vinyl(1,2-polybutadiene, calculated on the butadiene fraction)=55%, block styrene (>6 styrene units): 3%, block styrene comprising 4-6 styrene units: 25%.

The Mooney Viscosity ML 1+4 of product was 69.1.

The DOP/nBL,pm ratio and the styrene content were in an inventive range but the reaction temperature was too high, such that an SSBR was obtained with 25% block styrene comprising 4-6 styrene units.

Example 5

Continuous Polymerization, T=40° C., DOP/Active Initiator≈2

Styrene-butadiene copolymerization was performed using the conditions described above. A ratio of monomers/total feed of 12% was employed. The following conditions were employed in this trial:

Styrene:butadiene=44 wt %:56 wt %; DOP/active lithium (mol/mol)=2.44. The temperatures of both reactors was kept at 40° C. The flow of the total amount of ingredients and solvent was regulated in order to achieve a residence time of 70 minutes in the first reactor and 140 minutes in the second reactor. The following amounts were fed into the first polymerization reactor: Sty=3.41 g/min, Bde=4.53 g/min, Cyclohexane=58.22 g/min, nBL,pm=0.0574 mmol/min,nBL, exc=0.00739 mmol/min; DOP=0.14 mmol/min, 1,2-Bde=0.01037 mmol/min.

Methanol as a terminating agent and IRGANOX 1520 (0.15 phr) as antioxidant were added to the polymeric solution out of the second reactor. A total conversion of 88.97% was obtained out of the first reactor, and a complete conversion was obtained out of the second reactor.

The polymer coming out of the second reactor was analyzed by GPC with a polystyrene calibration: Mn=206700, Mw=375573, MWD=1.817. The microstructure and styrene block content were measured by $^1$H-NMR. The following results were obtained: styrene=46%, vinyl(1,2-polybutadiene, calculated on the butadiene fraction)=71.5%, block styrene (>6 styrene units): 9%, block styrene comprising 4-6 styrene units: 42%.

The Mooney Viscosity ML1+4 of product was 54.7.

The DOP/active initiator ratio, the styrene content, and the temperature were in an inventive range. The resulting SSBR was obtained with more than 20% block styrene comprising 4-6 styrene units.

The entire contents of every one of the patent and non-patent documents cited above are hereby incorporated by reference, except that in the event of any inconsistent disclosure or definition from the present specification, the disclosure or definition herein shall be deemed to prevail.

The foregoing detailed description and accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

The invention claimed is:

1. A polymer comprising:
   (a) a block styrene content containing 4 to 6 styrene units from about 27 to about 50 weight percent based on total styrene content in the polymer;
   (b) a vinyl content from about 30 to about 80 weight percent based on total amount of polymerized 1,3-butadiene; and
   (c) a styrene content from about 40 to about 70 weight percent based on total weight of polymer.

2. The polymer of claim 1 having a block styrene content with more than 6 consecutive styrene units of less than about 25 weight percent based on total styrene content in the polymer.

3. The polymer of claim 1 having an amount of styrene incorporated with fewer than 4 consecutive styrene units of between about 30 and about 73 weight percent based on total styrene content.

4. The polymer of claim 1 produced using a batch process and having a molecular weight distribution (Mw/Mn) from about 1.05 to about 2.

5. The polymer of claim 1 produced using a continuous process and having a molecular weight distribution (Mw/Mn) from about 1.5 to about 2.5.

6. The polymer of claim 1 having a number-average molecular weight greater than or equal to about 80,000 g/mole.

7. The polymer of claim 1 having a weight-average molecular weight greater than or equal to about 84,000 g/mole.

8. The polymer of claim 1 having a Mooney viscosity from about 20 to about 150.

9. A composition comprising the polymer of claim 1.

10. The composition of claim 9 further comprising an oil in an amount from about 5 to about 40 weight percent based on weight of the polymer.

11. An article comprising at least one component formed from the composition of claim 9.

12. A process for polymerization of a polymer comprising monomeric units derived from a styrene monomer and a 1,3-butadiene monomer, the process comprising:
    polymerizing the monomers in the presence of an initiator and a polar agent;
    wherein the polar agent comprises a structure I:

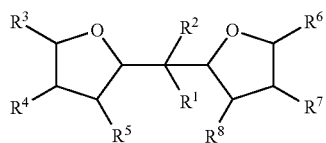

(I)

wherein $R^1$ and $R^2$ are each independently an alkyl group;
wherein $R^3$, $R^4$, $R^5$, $R^6$, $R^7$ and $R^8$ are each independently selected from the group consisting of an alkyl group and hydrogen;
wherein a molar ratio of the polar agent to active initiator is greater than about 0.5;
wherein styrene content of a monomer mixture added in the polymerization is greater than about 40 weight percent based on total weight of added monomers; and
wherein the polymerization is run at a temperature of less than about 80° C.

13. The process of claim 12 wherein $R^1$ and $R^2$ are each independently a $C_1$-$C_4$ alkyl group.

14. The process of claim 12 wherein $R^3$, $R^4$, $R^5$, $R^6$, $R^7$ and $R^8$ are each independently selected from the group consisting of hydrogen and a $C_1$-$C_4$ alkyl group.

15. The process of claim 12 wherein the polar agent comprises ditetrahydrofurylpropane.

16. The process of claim 12 wherein the initiator comprises n-butyl lithium.

17. The process of claim 12 wherein total monomer conversion is greater than about 96 weight percent based on total amount of monomer feed.

18. The process of claim 12 wherein the polymer comprises a vinyl content from about 30 to about 80 weight percent based on total amount of polymerized 1,3-butadiene.

19. The process of claim 12 wherein the molar ratio of the polar agent to active initiator is between about 0.5 and about 10.

20. The process of claim 12 wherein the polymerization is run at a temperature of between about 10° C. and about 80° C.

21. The process of claim 12 wherein the polymer has a block styrene content containing 4 to 6 styrene units from about 27 to about 50 weight percent based on total styrene content in the polymer.

22. The process of claim 12 wherein the polymer has a block styrene content with more than 6 consecutive styrene units of less than about 25 weight percent based on total styrene content in the polymer.

23. The process of claim 12 wherein the polymerizing takes place in a hydrocarbon solvent.

* * * * *